United States Patent [19]

Fujibayashi

[11] 4,456,345
[45] Jun. 26, 1984

[54] THIN TYPE PHOTOGRAPHIC LENS SYSTEM

[75] Inventor: Kazuo Fujibayashi, Kanagawa, Japan

[73] Assignee: Canon Kabushiki Kaisha, Tokyo, Japan

[21] Appl. No.: 491,785

[22] Filed: May 9, 1983

Related U.S. Application Data

[63] Continuation of Ser. No. 218,123, Dec. 19, 1980, abandoned.

[30] Foreign Application Priority Data

Dec. 25, 1979 [JP] Japan ................. 54-168560

[51] Int. Cl.³ .................. G02B 9/34; G02B 15/14
[52] U.S. Cl. ................... 350/469; 350/432
[58] Field of Search .................. 350/469, 432

[56] References Cited

U.S. PATENT DOCUMENTS 3,951,523  4/1976  Nishimoto ............... 350/432
4,124,276  11/1978 Okano et al. ............ 350/469
4,204,747  5/1980  Imai ..................... 350/465

Primary Examiner—John K. Corbin
Assistant Examiner—Rebecca D. Gass
Attorney, Agent, or Firm—Toren, McGeady and Stanger

[57] ABSTRACT

The disclosed wide angle objective has a smaller telephoto ratio than unity and includes, from front to rear, a positive meniscus lens of forward convexity, a bi-concave lens and a bi-convex lens followed, after a large space, by a negative meniscus lens of forward concavity with a diaphragm positioned between the bi-convex lens and the negative meniscus lens. During focusing, the positive meniscus lens, bi-concave lens and bi-convex lens are axially moved in unison. The bi-convex lens is formed by positive and negative lens elements cemented together, and the front surface of the negative meniscus lens is aspherical.

7 Claims, 13 Drawing Figures

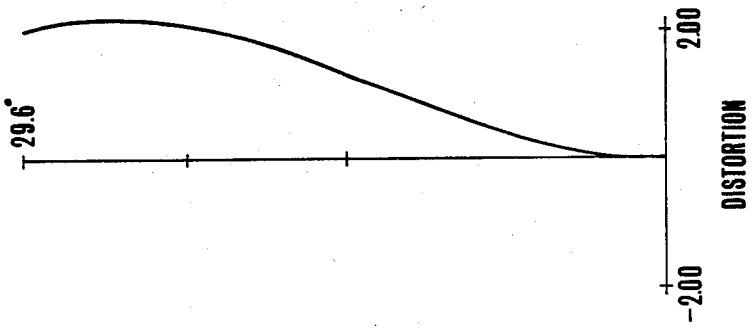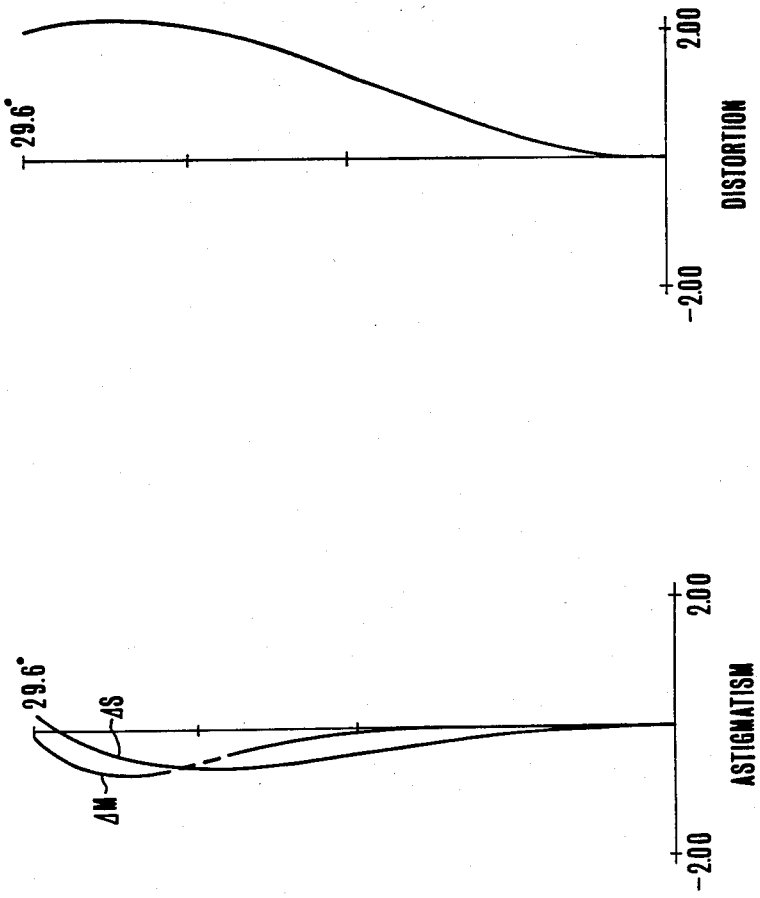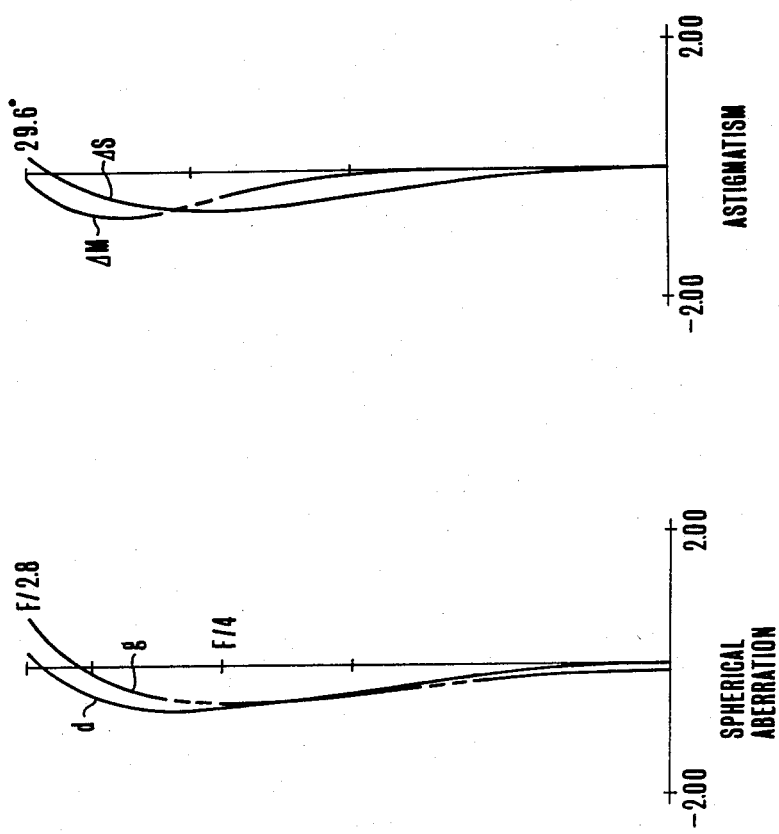

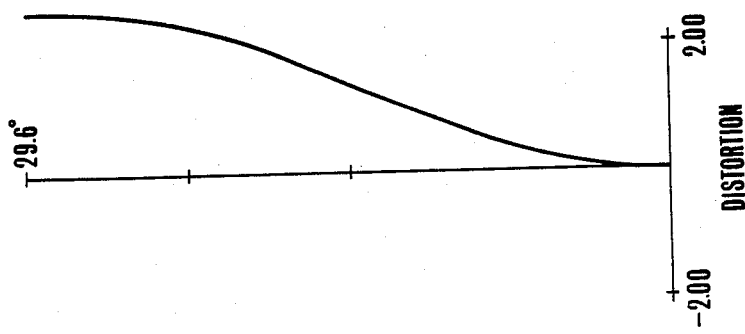
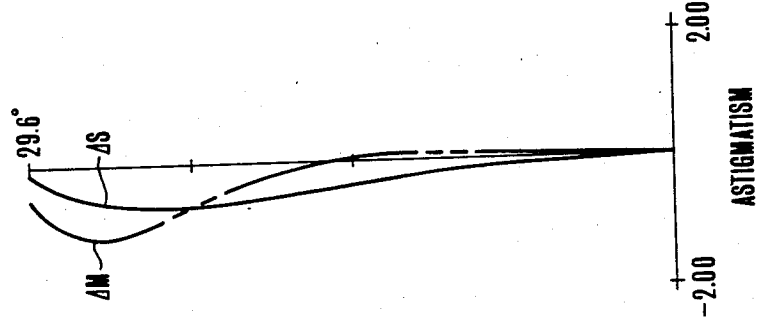
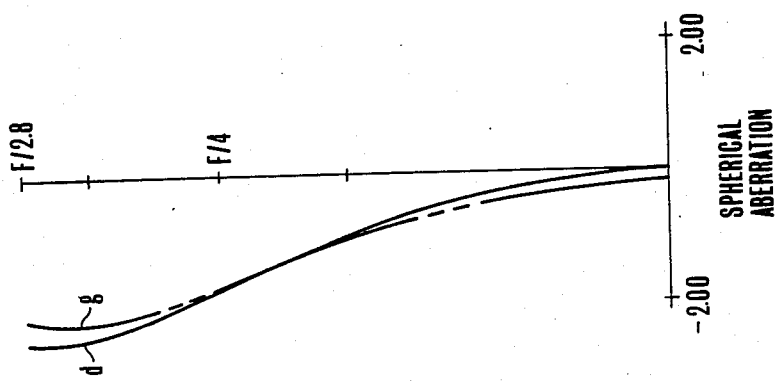

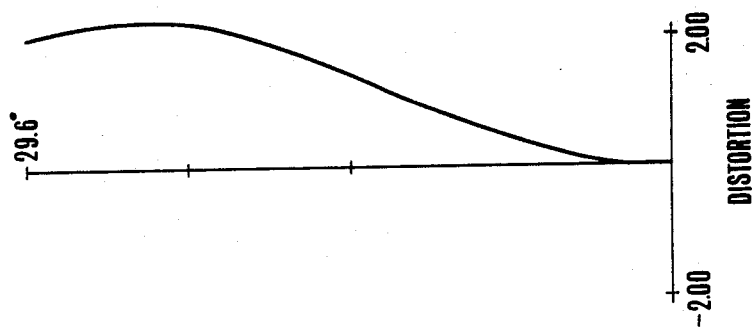
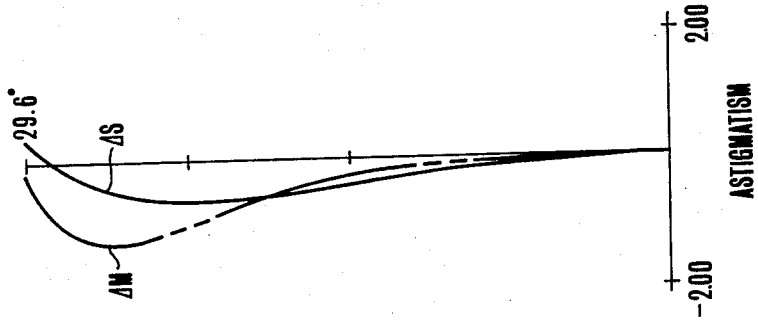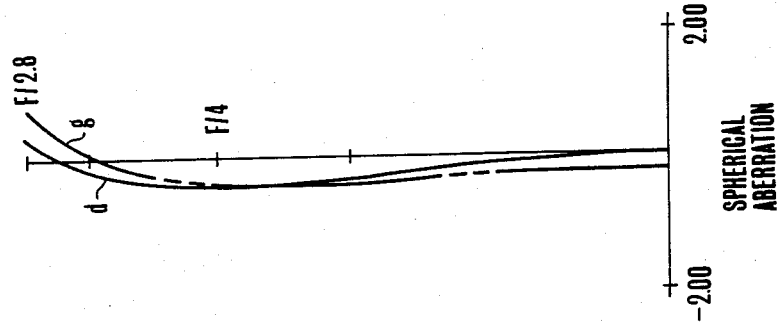

THIN TYPE PHOTOGRAPHIC LENS SYSTEM

This application is a continuation of application Ser. No. 218,123, filed Dec. 19, 1980 now abandoned.

BACKGROUND OF THE INVENTION

This invention relates to photographic objectives, and more particularly to photographic objectives having shortened total lengths.

Recently, as the minimization of the bulk and size of photographic camera advances, there is an increasing demand for a compact wide angle photographic objective by shortening the total length. However, as far as the wide angle lens system is concerned, the shortening of the total length generally leads to extremely large astigmatism and distortion. It is, therefore, quite difficult to design a lens system of shortened total length while still preserving a high image quality which is uniform throughout the entire area of the format.

To overcome this drawback and to obtain a good optical performance, a method is proposed in Japanese Patent Publication No. Sho 44(1969)-10831 where the front lens group is provided with a negative meniscus lens with strong curvature toward the rear and where the front surface of this meniscus lens is made aspherical. It is also known later to reduce the number of lens elements in the front lens group with the intention of minimizing the bulk and size of the objective as disclosed in U.S. Pat. Nos. 3,998,527 and 3,951,523.

On the other hand, Japanese Patent Laid Open No. Sho 54(1979)-76148 (U.S. Pat. No. 4,204,747) discloses an objective comprising a positive meniscus lens, a bi-concave lens, a bi-convex cemented lens, a negative meniscus lens concave toward the front, and a positive meniscus lens, the last meniscus lens being provided instead of the aspherical surface to facilitate the correction of distortion. In this five-component photographic objective, if focusing is performed by moving the positive meniscus lens to the comented lens in unison, the aberrations will deteriorate. It is therefore pointed out in the specification that focusing provision is made at the cemented lens.

To achieve a shortening of the total length of the lens system, on the other hand, use may be made of the telephoto type in which a lens group of positive power is arranged in front of a lens group of negative power. In the case of the wide angle objective, however, since the limitation of the outer diameter of the objective to an appropriate value requires that the diaphragm be positioned at the middle part of the lens system with the lens group of positive power arranged on the front side of the diaphragm and the lens group of negative power on the rear side, such lens system tends to increase the difficulty of correction of the off-axial aberrations such as astigmatism and distortion.

SUMMARY OF THE INVENTION

An object of the present invention is to shorten an objective of wide angular field of view in the longitudinal direction.

Another object of the invention is to achieve a good state of correction of the various aberrations for high grade imaging performance.

Still another object of the invention is to provide an efficient focusing method.

The present invention has the advantage of providing a four-component lens system with the first component of positive power followed in such adjacent relationship by the second component of negative power and with the lens configuration made suitable much that the off-axial aberrations which would be otherwise objectionably increased are as small as possible. Further, the third component is constructed in the cemented form and the fourth component in the aspherical form with the advantage that the residual off-axial aberrations particularly regarding the coma and astigmatism are well compensated for. Another feature is that the focusing movement is imparted into the front three components, so that the total axial movement is remarkably decreased for the equivalent focusing range while the range of variation of the aberrations is limited to a minimum.

In the latter connection, it should be pointed out that the lens system of the invention may be moved as a whole to effect focusing as is common in the art. The impartment of independent movement to the first component alone for focusing, or the so-called front focusing is, however, not suitable, since extremely large off-axial aberrations are produced as the first and second components cannot be positioned adjacent to each other in order to avoid the mechanical interference therebetween when focusing at infinity. The use of only the third component as the focusing member, or the so-called middle focusing gives rise to a problem that as the axial separation between the second and third components is narrowed, the distortion is increased objectionably when focused down to shorter object distances.

It is now found that the above-described difficult problems can be eliminated by imparting independent movement into the first three of the four components.

BRIEF DESCRIPTION OF THE DRAWINGS

FIGS. 2A-2C are aberration curves of Example 1 of a specific photographic objective when focused at infinity.

FIGS. 3A-3C are aberration curves of Example 1 objective when focused to a short object distance of 1/22 in image magnification.

FIGS. 4A-4C are aberration curves of Example 2 of a specific photographic objective when focused at infinity.

DETAILED DESCRIPTION OF THE PREFERRED EMBODIMENTS

Figure 1:
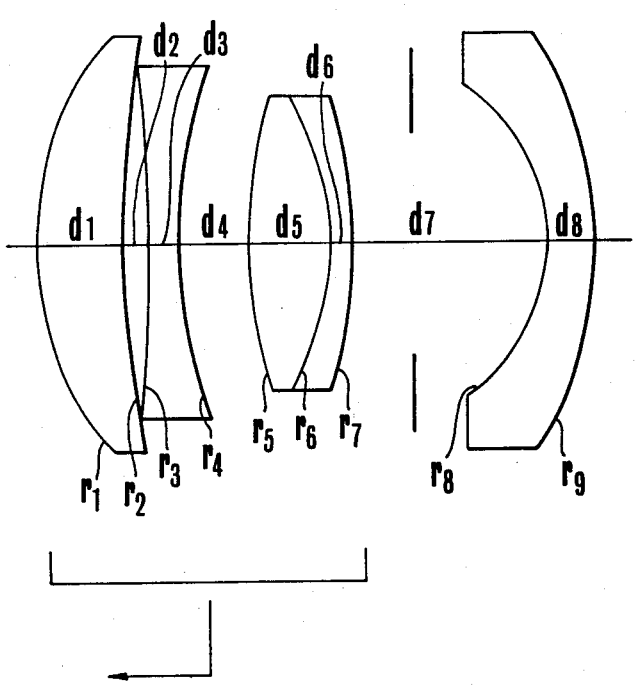
FIG. 1 is a longitudinal section view of an embodiment of a wide angle objective lens according to the present invention.
Figure 5C:
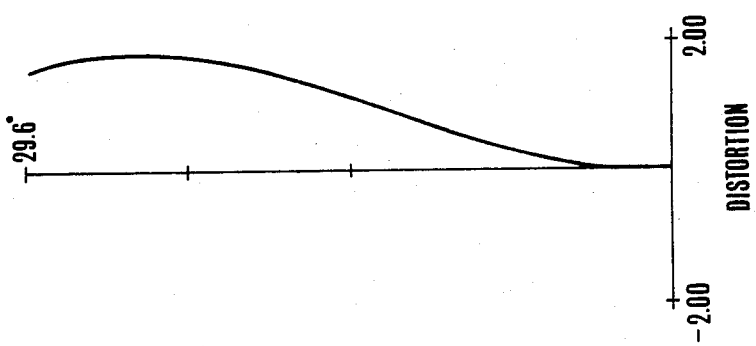
FIGS. 5A-5C are aberration curves of Example 3 of a specific photographic objective when focused at infinity.
Figure 5B:
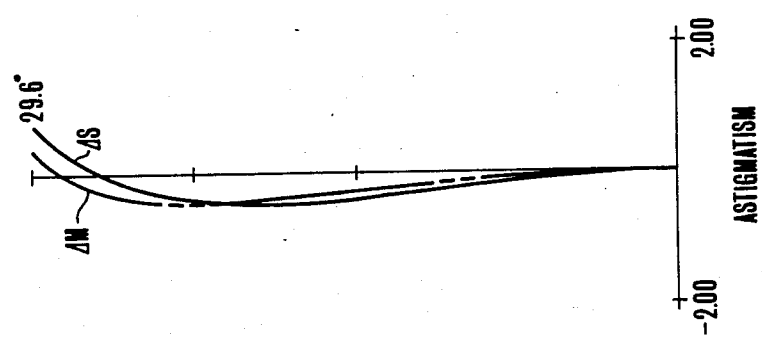
Figure 5A:
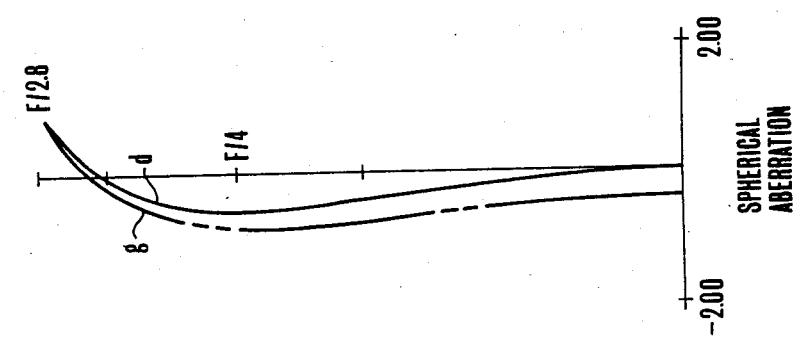

As shown in FIG. 1, the general embodiment of the present invention comprises, from front to rear, a positive meniscus lens of forward convexity, a bi-concave lens, a bi-convex lens and, after the largest space, a negative meniscus lens of forward concavity, the positive meniscus lens, bi-convex lens and bi-concave lens moving forward as a whole to effect focusing down from infinity to shorter object distances. By this focusing provision, it is made possible to position the bi-concave lens so adjacent to the positive meniscus lens as to be in edge contact, and also to maintain the constant axial separation between the bi-concave lens and bi-convex lens. As is understandable from the comparison of FIGS. 2A-2C with FIGS. 3A-3C, though the aberrations are varied to some extent during focusing, the image quality can be maintained at the standard level.

The features of the invention are as follows: The bi-convex lens is constructed in the form of a doublet consisting of a bi-convex lens element and a negative meniscus lens cemented together at their adjoining surfaces, and the photographic objective fulfills the following requirements:

(1) $2.2 < r_2/r_1 < 3.8$
(2) $0.6 < |fA|/f < 1.0$, $fA < 0$
(3) $0.6 < r_5/r_4 < 1.2$
(4) $0.08 < n_4 - n_3 < 0.3$ where f: the focal length of the entire system,
fA: the focal length of the air lens between the first and second lenses,
ri: the radius of curvature of the i-th lens surface counting from front, and
nj: the index of refraction of the glass of which the j-th lens element counting from front is made up On the other hand, taking the axial direction as X-axis with the original point at the vertex of the front surface of the last or negative meniscus lens and the perpendicular direction thereto as Y-axis, and using an equation $X = F(Y)$ in expressing the symmetric front surface of the above-cited last or 4th lens, this lens surface is an aspheric surface fulfilling the following requirements:

(5) $1 \times 10^{-3} < \Delta X(0.7\ r_8)/f < 2 \times 10^{-3}$
$1 \times 10^{-4} < \Delta X(0.5\ r_8)/f < 5 \times 10^{-4}$ where $\Delta X(0.7\ r_8)$ and $\Delta X(0.5\ r_8)$ are the values which the amount of deviation of the above-described aspheric surface from the paraxial spherical surface having the radius of curvature $r_8$ takes when $Y = 0.7\ r_8$ and $0.5 r_8$ respectively, the amount of deviation being expressed by:

$$\Delta X(Y) = F(Y) - \frac{Y^2}{r_8 + r_8\sqrt{1 - \left(\frac{Y}{r_8}\right)^2}}$$

The above-described requirements will next be explained.

Requirements (1) and (2) represent conditions under which the off-axial aberrations that become serious when the telephoto type is employed can be prevented. When the upper limits are exceeded, extremely large positive distortion and negative astigmatism are produced. When the lower limits are exceeded, extremely large inward coma is produced, and moreover overcorrection of spherical aberration results. Requirement (3) represents a condition under which coma is well corrected for without causing the production of appreciable spherical aberration. When the upper limit is exceeded, extremely large outward coma is produced, and when the lower limit is exceeded, extremely large inward coma is produced. Requirement (4) represents a condition under which coma is well corrected for. When the lower limit is exceeded, extremely large outward coma is produced. When the upper limit is exceeded, it becomes difficult to achieve a flatness of the image surface.

Requirement (5) represents conditions under which the off-axial aberrations that are difficult to correct in far as the system is spherical are compensated for in good balance. When the upper limits are exceeded, the outward coma is increased objectionably. When the lower limits are exceeded, the positive distortion is increased objectionably. Thus, the image quality cannot be made uniform over the entire area of the frame.

Recently, as the aspheric surface machining technique has achieved a great advance, aspheric surfaces can be formed with high surface precision and produced at a high efficiency. But in comparison with the spherical lenses, the aspherical lenses are far more expensive. In the present invention, the aspherical lens component is arranged near to the focal plane with the advantage that because of a small area across which the all image bearing light rays pass, the requirement for the surface precision is not so rigorous as compared with the Gauss type lens in which all the image bearing light rays spread fully in passing through the lens surfaces. Therefore, for the 4th or aspherical lens use may be made of a plastic lens manufactured by the injection-molding techniques without sacrificing an unduly large imaging performance, thus giving an advantage that the complete objective of the invention can be finished at a low cost. Further, if the residual aberrations of the objective even with the exclusion of the last lens are balanced in a relatively good state and minimized, the range of variation of the aberrations throughout the focusing range will be small and the total axial movement is small as compared with the whole focusing. For example, in Example 1, the total axial movement from the position for infinitely distant object to a position for the image magnification of 1/22 can be decreased to 0.4 times that of the bodily movable lens.

Three examples of specific objectives may be constructed in accordance with the numerical data given in the following tables where r is the radii of curvature, d is the axial thicknesses of the lens elements and the axial air separations, nd is the indices of refraction for the spectral d-line of the materials of which the lens elements are made up, and $\nu d$ is the Abbe numbers, and where B, C and D are defined in the following equation:

$$X = \frac{Y^2}{r_8 + r_8\sqrt{1 - \left(\frac{Y}{r_8}\right)^2}} + BY^4 + CY^6 + DY^8$$

EXAMPLE 1 f = 100  b.f. (Back Focal Length) = 37.524

| | r | d | nd | νd |
|---|---|---|---|---|
| 1 | 32.565 | 9.719 | 1.7725 | 49.6 |
| 2 | 104.005 | 2.932 | 1. | |
| 3 | −157.603 | 3.158 | 1.80518 | 25.4 |
| 4 | 54.891 | 7.322 | 1. | |
| 5 | 52.011 | 8.924 | 1.56732 | 42.8 |
| 6 | −30.23 | 2.632 | 1.80610 | 40.9 |
| 7 | −51.355 | 21.137 | 1. | |
| 8 | −19.187* | 5.263 | 1.49171 | 57.4 |
| 9 | −40.559 | | 1. | |

$B = 2.2526 \times 10^{-4}$
$C = 1.3571 \times 10^{-7}$
$D = 7.1264 \times 10^{-9}$

EXAMPLE 2 f = 100  b.f. = 38.077

| | r | d | nd | νd |
|---|---|---|---|---|
| 1 | 32.935 | 9.983 | 1.7725 | 49.6 |
| 2 | 119.814 | 2.497 | 1. | |

-continued

| | f = 100 | b.f. = 38.077 | | |
|---|---|---|---|---|
| | r | d | nd | νd |
| 3 | −188.191 | 3.158 | 1.80518 | 25.4 |
| 4 | 56.965 | 8.28 | 1. | |
| 5 | 60.962 | 8.398 | 1.56732 | 42.8 |
| 6 | −33.217 | 2.632 | 1.66755 | 41.9 |
| 7 | −66.135 | 20.233 | 1. | |
| 8 | −18.806* | 5.263 | 1.49171 | 57.4 |
| 9 | −36.015 | | 1. | |

$B = 1.4265 \times 10^{-4}$
$C = 7.3818 \times 10^{-7}$
$D = 7.4476 \times 10^{-9}$

EXAMPLE 3

| | f = 100 | b.f. = 38.037 | | |
|---|---|---|---|---|
| | r | d | nd | νd |
| 1 | 32.46 | 9.61 | 1.7725 | 49.6 |
| 2 | 83.094 | 3.683 | 1. | |
| 3 | −135.174 | 3.158 | 1.80518 | 25.4 |
| 4 | 63.854 | 6.723 | 1. | |
| 5 | 45.879 | 9.824 | 1.56732 | 42.8 |
| 6 | −28.817 | 2.632 | 1.7352 | 41.1 |
| 7 | −53.831 | 19.416 | 1. | |
| 8 | −18.348* | 5.263 | 1.49171 | 57.4 |
| 9 | −40.757 | | 1. | |

$B = 3.3024 \times 10^{-4}$
$C = 7.2842 \times 10^{-7}$
$D = 7.9985 \times 10^{-9}$ Values of the factors in the various inequalities

| | Example 1 | Example 2 | Example 3 |
|---|---|---|---|
| $r_2/r_1$ | 3.19 | 3.64 | 2.56 |
| $|f_A|/f$ | 0.81 | 0.94 | 0.65 |
| $r_5/r_4$ | 0.948 | 1.07 | 0.72 |
| $n_4-n_3$ | 0.23878 | 0.10023 | 0.16788 |
| $\Delta x(0.7\ r_8)/f$ | $1.56 \times 10^{-3}$ | $1.48 \times 10^{-3}$ | $1.82 \times 10^{-3}$ |
| $\Delta x(0.5\ r_8)/f$ | $0.26 \times 10^{-3}$ | $0.21 \times 10^{-3}$ | $0.32 \times 10^{-3}$ |
| Telephoto Ratio | 0.986 | 0.985 | 0.983 |

3rd-Order Aberration Coefficient

Example 1:

| | SA | CM | AS | PT | DS |
|---|---|---|---|---|---|
| 1 | 7.1198 | −0.5342 | 0.0401 | 1.3383 | −0.1034 |
| 2 | 0.6685 | −1.0895 | 1.7757 | −0.4190 | −2.2111 |
| 3 | −5.4749 | 4.5987 | −3.8628 | −0.2830 | 3.4823 |
| 4 | −0.3591 | −0.2469 | −0.1697 | −0.8126 | −0.6753 |
| 5 | 0.3948 | 0.3056 | 0.2365 | 0.6959 | 0.7216 |
| 6 | −4.6123 | 1.5697 | −0.5342 | −0.2790 | 0.2768 |
| 7 | 9.0722 | −4.4654 | 2.1979 | 0.8691 | −1.5096 |
| 8 | −6.5325 | 0.0656 | 0.1085 | −1.7180 | 0.0560 |
| 9 | 1.0501 | −0.4526 | 0.1951 | 0.8127 | −0.4344 |
| Total | 1.3266 | −0.2490 | −0.0129 | 0.2044 | −0.3971 |

SA: Spherical Aberration
CM: Coma
AS: Astigmatism
PT: Petzval Sum
DS: Distortion Example 2:

| | SA | CM | AS | PT | DS |
|---|---|---|---|---|---|
| 1 | 6.8328 | −0.5938 | 0.0512 | 1.3233 | −0.1186 |
| 2 | 1.0167 | −1.4600 | 2.0967 | −0.3638 | −2.4886 |
| 3 | −5.4784 | 4.7227 | −4.0712 | −0.2370 | 3.7139 |
| 4 | −0.1289 | −0.1101 | −0.0940 | −0.7830 | −0.7492 |
| 5 | 0.0799 | 0.0951 | 0.1131 | 0.5938 | 0.8408 |
| 6 | −1.7693 | 0.6618 | −0.2475 | −0.1155 | 0.1358 |
| 7 | 5.7997 | −3.3375 | 1.9206 | 0.6053 | −1.4536 |
| 8 | −6.7123 | 0.0812 | 0.0676 | −1.7528 | 0.0428 |
| 9 | 1.2638 | −0.4417 | 0.1543 | 0.9153 | −0.3738 |
| Total | 0.9540 | −0.3823 | −0.0092 | 0.1856 | −0.4505 |

Example 3:

| | SA | CM | AS | PT | DS |
|---|---|---|---|---|---|
| 1 | 7.1891 | −0.6500 | 0.0588 | 1.3426 | −0.1267 |
| 2 | 0.1928 | −0.4922 | 1.2563 | −0.5245 | −1.8679 |
| 3 | −4.7436 | 4.1129 | −3.5661 | −0.3300 | 3.3781 |
| 4 | −0.2655 | −0.2158 | −0.1753 | −0.6985 | −0.7100 |
| 5 | 0.7304 | 0.4454 | 0.2716 | 0.7890 | 0.6467 |
| 6 | −3.9344 | 1.3138 | −0.4387 | −0.2142 | 0.2180 |
| 7 | 8.5883 | −4.3371 | 2.1902 | 0.7871 | −1.5036 |
| 8 | −7.5167 | 0.2573 | 0.1419 | −1.7966 | 0.1025 |
| 9 | 1.0759 | −0.5080 | 0.2398 | 0.8088 | −0.4950 |
| Total | 1.3164 | −0.0736 | −0.0215 | 0.1637 | −0.3579 |

What is claimed is:

1. A photographic objective lens system consisting of:

positive meniscus lens means of forward convexity, bi-concave lens means arranged toward the image end of said positive meniscus means, biconvex lens means arranged toward the image end of said bi-concave lens means, and negative meniscus lens means of forward concavity arranged toward the image end of said bi-convex lens means, said positive meniscus lens means, said bi-concave lens means, and said bi-convex means being arranged for movement along a common optical axis for effecting focusing of said photographic lens system, said lens means having surfaces satisfying the following:

$2.2 < r_2/r_1 < 3.8$ where $r_1$ is the radius of curvature of the front surface of the positive meniscus lens and $r_2$ is the radius of curvature of the rear surface of the positive mensicus lens;

said negative meniscus lens means having at least one aspheric surface, and wherein $0.6 < |f_A|/f < 1.0$, $f_A < 0$ where f is the focal length of the entire system and $f_A$ is the focal length of the air lens formed between the positive meniscus lens means and the bi-concave lens means, said lens means satisfying the following conditions:

$0.6 < r_5/r_4 < 1.2$ where $r_4$ is the radius of curvature of the rear surface of the bi-concave lens means and $r_5$ is the radius of curvature of the front surface of the bi-concave lens means.

2. A photographic objective lens system comprising:

positive meniscus lens means of forward convexity, bi-concave lens means arranged toward the image end of said positive meniscus means, biconvex lens means arranged toward the image end of said bi-concave lens means, and negative meniscus lens means of forward concavity arranged toward the image end of said bi-convex lens means, said positive meniscus lens means, said bi-concave lens means, and said bi-convex means being arranged for movement along a common optical axis for effecting focusing of said photographic lens system, said lens means having surfaces satisfying the following:

$2.2 < r_2/r_1 < 3.8$ where $r_1$ is the radius of curvature of the front surface of the positive meniscus lens and $r_2$ is the radius of curvature of the rear surface of the positive mensicus lens, said negative meniscus lens means having at least one aspheric surface, and wherein $0.6 < |f_A|/f < 1.0$, $f_A < 0$ where f is the focal length of the entire system and $f_A$ is the focal length of the air lens formed between the positive meniscus lens means and the bi-concave lens means, said lens means satisfying the following conditions:

$0.6 < r_5/r_4 < 1.2$ where $r_4$ is the radius of curvature of the rear surface of the bi-concave lens means and $r_5$ is the radius of curvature of the front surface of the bi-concave lens means, said lens means defining an axial direction and a perpendicular direction transverse to the axial direction, and taking the axial direction as an X-axis with the orgin at the vertex of the front surface of said negative meniscus lens means and the perpendicular direction as a Y-axis and using an equation $X=F(Y)$ in expressing this symmetric front surface with respect to the optical axis, the following conditions being satisfied:

$1 \times 10^{-3} < \Delta X(0.7R)/f < 2 \times 10^{-3}$ $1 \times 10^{-4} < \Delta X(0.5R)/f < 5 \times 10^{-4}$ where $\Delta X(0.7R)$ and $\Delta X(0.5R)$ represent the values which the amount of deviation of the aspheric surface from the paraxial surface (the radius of curvature R) as defined below takes when $Y=0.7R$ and $Y=0.5R$ respectively, and f is the focal length of the entire system, and wherein $$\Delta X(Y) = F(Y) - \frac{Y^2}{R + R\sqrt{1 - \left(\frac{Y}{R}\right)^2}}.$$

3. A photographic objective lens system comprising: positive meniscus lens means of forward convexity, bi-concave lens means arranged toward the image end of said positive meniscus means, biconvex lens means arranged toward the image end of said bi-concave lens means, and negative meniscus lens means of forward concavity arranged toward the image end of said bi-convex lens means, said positive meniscus lens means, said bi-concave lens means, and said bi-convex means being arranged for movement along a common optical axis for effecting focusing of said photographic lens system, said lens means having surfaces satisfying the following:

$2.2 < r_2/r_1 < 3.8$ where $r_1$ is the radius of curvature of the front surface of the positive meniscus lens and $r_2$ is the radius of curvature of the rear surface of the positive mensicus lens, said lens means defining an axial direction and a perpendicular direction transverse to the axial direction, and taking the axial direction to an X-axis with the origin at the vertex of the front surface of said negative meniscus lens means and the perpendicular direction as a Y-axis and using an equation $X=F(Y)$ in expressing this symmetric front surface with respect to the optical axis, the following conditions being satisfied:

$1 \times 10^{-3} < \Delta X(0.7R)/f < 2 \times 10^{-3}$ $1 \times 10^{-4} < \Delta X(0.5R)/f < 5 \times 10^{-4}$ where $\Delta X(0.7R)$ and $\Delta X(0.5R)$ represent the values which the amount of deviation of the aspheric surface from the paraxial surface (the radius of curvature R) as described below takes when $Y=0.7R$ and $Y=0.5R$ respectively, and f is the focal length of the entire system, and wherein $$\Delta X(Y) = F(Y) - \frac{Y^2}{R + R\sqrt{1 - \left(\frac{Y}{R}\right)^2}}.$$

4. A photographic objective lens system comprising: positive meniscus lens means of forward convexity, bi-concave lens means arranged on the image side of said positive meniscus lens means, bi-convex lens means arranged on the image side of said bi-concave lens means, and negative meniscus lens means of forward concavity arranged on the image side of said bi-convex lens means, said positive meniscus lens means, said bi-concave lens means and said bi-convex lens means being arranged to be moved along a common optical axis for effecting focusing of said photographic lens system, the front surface of said negative meniscus lens means is aspheric, taking the axial direction as X-axis with the original point at the vertex of the front surface of said negative meniscus lens means and the perpendicular direction as Y-axis and using an equation $X=F(Y)$ in expressing the symmetric front surface with respect to the optical axis, the following conditions are satisfied:

$1 \times 10^{-3} < \Delta X(0.7R)/f 2 \times 10^{-3}$ $1 \times 10^{-4} < \Delta X(0.5R)/f 5 \times 10^{-4}$ where $\Delta X(0.7R)$ and $\Delta X(0.5R)$ represent the values which the amount of deviation of the aspheric surface from the paraxial surface (the radius of curvature R) as defined below takes when $Y=0.7R$ and $Y=0.5R$ respectively, and f is the focal length of the entire system $$\Delta X(Y) = F(Y) - \frac{Y^2}{R + R\sqrt{1 - \left(\frac{Y}{R}\right)^2}}$$

5. A photographic lens system according to claim 4, satisfying the following conditions:

$2.2 < r_2/r_1 < 3.8 \quad fA < 0$ $0.6 < |fA|/f < 1.0$ $0.6 < r_5/r_4 < 1.2$ where f is the focal length of the entire system, fA is the focal length of the air lens formed between said positive meniscus lens means and said bi-concave lens means, $r_1$ is the radius of curvature on the front surface of said positive meniscus lens means, $r_2$ is the radius of curvature of the rear surface of said positive meniscus lens means, $r_4$ is the radius of curvature of the rear surface of said bi-concave lens means, and $r_5$ is the radius of curvature of the front surface of said bi-convex lens means.

6. A photographic lens system according to claim 5, satisfying the following condition:

$0.08 < n_4 - n_3 < 0.3$ where $n_3$ is the index of refraction of the said positive lens and $n_4$ is the index of refraction of said negative lens.

7. A photographic objective lens system consisting of:

positive meniscus lens means of forward convexity, bi-concave lens means arranged toward the image end of said positive meniscus lens means, bi-convex lens means arranged toward the image end of said bi-concave lens means, and negative meniscus lens means of forward concavity arranged toward the image end of said bi-convex lens means, said positive meniscus lens means, said bi-concave lens means, and said bi-convex means being arranged for movement along a common optical axis for effecting focusing of said photographic lens system, said lens means having surfaces satisfying the following:

$2.2 < r_2/r_1 < 3.8$ where $r_1$ is the radius of curvature of the front surface of the positive meniscus lens and $r_2$ is the radius of curvature of the rear surface of the positive meniscus lens, and wherein $0.6 < |f_A|/f < 1.0, f_A < 0$ where f is the focal length of the entire system and $f_A$ is the focal length of the air lens formed between the positive meniscus lens means and the bi-concave lens means.

* * * * *